Nov. 14, 1939.　　　　E. A. WEISS　　　　2,180,185
TANK
Filed Aug. 6, 1936　　　2 Sheets—Sheet 1
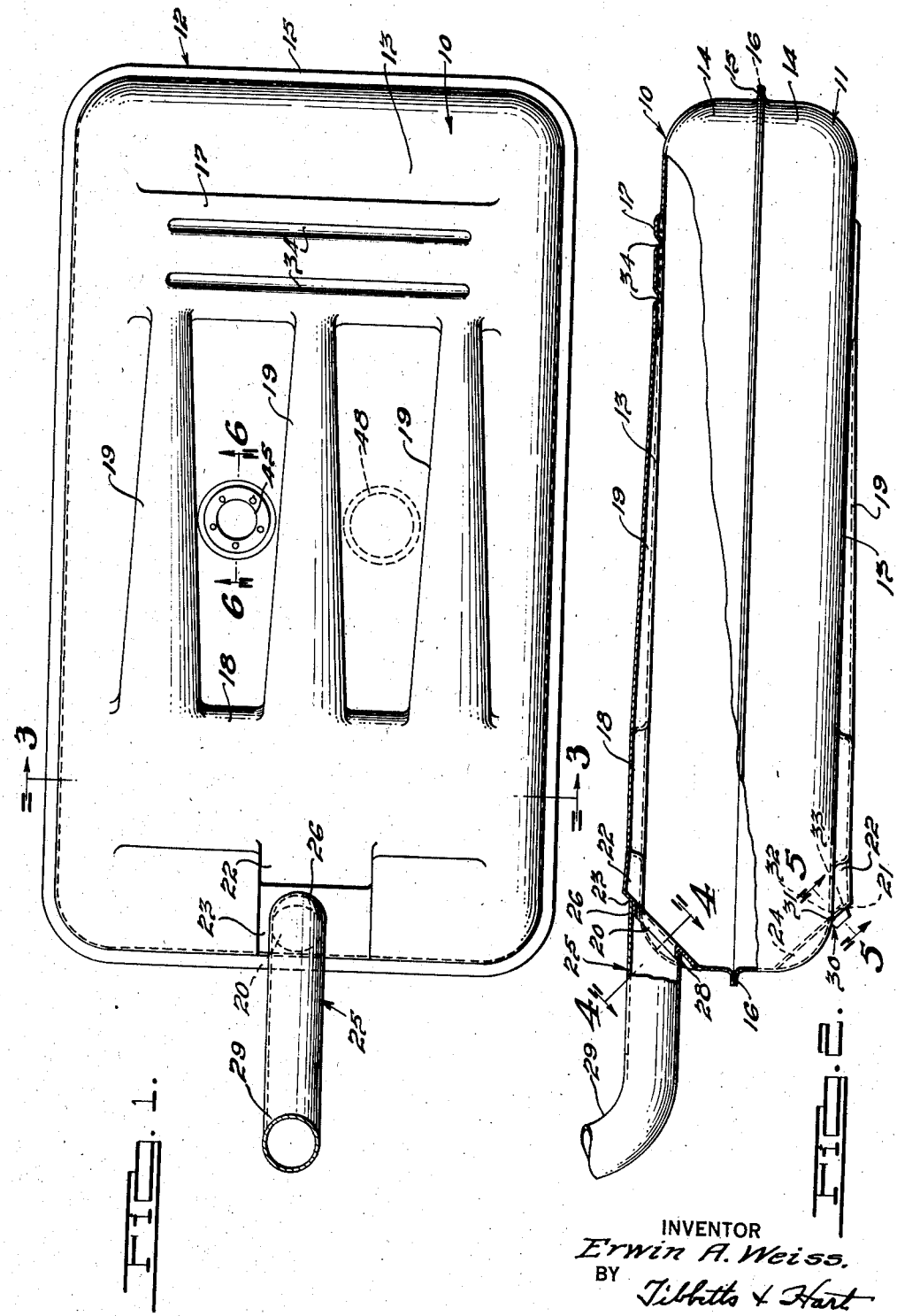
INVENTOR
*Erwin A. Weiss.*
BY
*Tibbitts & Hart*
ATTORNEYS.

Nov. 14, 1939.   E. A. WEISS   2,180,185
TANK
Filed Aug. 6, 1936   2 Sheets-Sheet 2

INVENTOR
*Erwin A. Weiss.*
BY
*Tibbetts & Hart*
ATTORNEYS.

Patented Nov. 14, 1939

2,180,185

UNITED STATES PATENT OFFICE 2,180,185

TANK

Erwin A. Weiss, Detroit, Mich., assignor to Packard Motor Car Company, Detroit, Mich., a corporation of Michigan Application August 6, 1936, Serial No. 94,587

6 Claims. (Cl. 220—86)

The invention relates to tanks and more particularly to fuel tanks for motor vehicles.

The fuel tanks conventionally used in motor vehicles are of such a construction that air is trapped in the top of the tank by the rising level of the replenishing fuel reaching the inlet conduit or spout before all the air is vented from the tank. This condition, commonly known as air lock, prevents the complete filling of the tank to an extent sometimes as great as four gallons, and while this condition is recognized to exist a remedy has not been found which will satisfy the manufacturers' demand for a tank simple in construction, low in cost, easy to manufacture and effective in its operation.

Many devices and tanks have been experimented with. Some of the devices comprise auxiliary equipment for venting the tanks, but the fact that they are auxiliary makes them objectionable since they not only increase the cost and complexity of the fuel system but entail additional time and apparatus for installing them. Many of these devices also cause a loss or overflow of fuel and have proven otherwise to be inefficient under all the conditions to which a fuel tank is subjected.

Some automobile manufacturers, in order to get away from auxiliary equipment, have increased the capacity of their tanks to provide a wide allowance for air lock conditions, while others, inconveniently to their body layout, have installed the tanks on the chassis in an edgewise manner. Notwithstanding all the contrivances resorted to and the expensive equipment employed and other inconveniences experienced, the air lock condition has continued to persist and the situation has remained comparatively unremedied.

One of the objects of the invention is to provide a fuel tank for motor vehicles in which air lock is eliminated.

Another object of the invention is to provide a fuel tank with an anti-air lock feature built into the structure of the tank itself.

Another object of the invention is to provide a fuel tank made of similar parts related to serve different purposes.

Another object of the invention is to provide two similar stampings related as a tank to afford fuel drainage and air escape functions respectively.

Another object of the invention is to provide an anti-air lock reinforced fuel tank with the reinforcement feature and air venting feature combined in a single structure.

Another object of the invention is to provide a fuel tank simple and rugged in its construction, efficient in its purpose and use, and inexpensive to manufacture.

These being among the objects of the present invention other and further objects will become apparent from the following description, the drawings relating thereto and the appended claims.

In the accompanying drawings:

Fig. 1 is a top view of a fuel tank embodying a preferred form of the invention.

Fig. 2 is a side elevation of the tank partly broken away.

Figure 3:
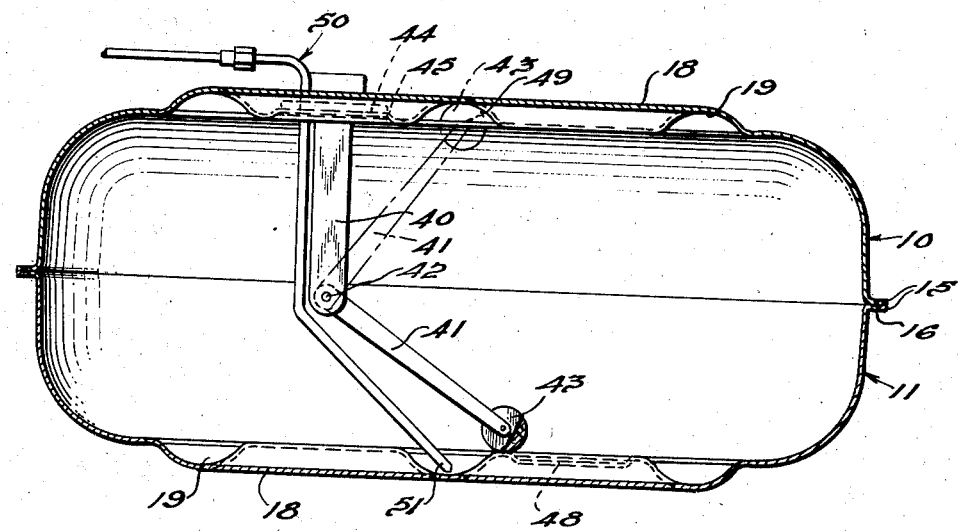
Fig. 3 is a sectional view of the tank taken on the line 3—3 of Fig. 1.

In the drawings the reference characters 10 and 11 indicate two similar rectangular pan-shaped sections or shells inverted relative to each other to provide upper and lower members respectively which are joined together to form a leakproof container or fuel tank 12. Each shell comprises a central flat base portion 13 disposed in a horizontal plane and bounded by side walls 14 which extend towards each other and terminate in abutting uniplanar flanges 15 welded together as at 16 in an air-tight relation.

The base portions 13 are similarly conformed cross-sectionally to provide outwardly disposed rib or trough means 17, 18 and 19 which serve to reinforce, drain and vent the tank. To accomplish these purposes the ribs 17 and 18 are provided with unequal depths, and extend transversely of the tank, the ribs 18 being of the greater depth, while the ribs 19 extend longitudinally of the tank in a manner inter-connecting the transverse ribs with a depth gradually increasing from the depth of the ribs 17 to that of the ribs 18. In this way the ribs form plural trough-like structures in the respective sections 10 and 11 which gradually deepen from one end of the tank to the other so that air levitating to the top of the tank will follow the upper ribs in the direction of their increasing depth until it is collected in the rib 18 while fuel gravitating in the tank will likewise follow the ribs until collected in the rib 18 in the lower portion 11. From these respective ribs 18 the air and fuel may be vented and drained in a suitable manner.

The venting and draining of the air and fuel is preferably accomplished through two apertures provided in the walls of the tank placed where they will have open communication with the ribs 18 in a manner including the depth of these ribs. To this end another rib 22 is provided in each shell of a depth equal to or greater than that of the ribs 18. These ribs 22 communicate with the others 18 and extend to a point adjacent the end of the tank where they terminate in inclined faces 23 and 24 provided in the sides 14 and bases 13 of the upper and lower sections 10 and 11, respectively. The apertures, 20 and 21, are provided in the faces 23 and 24 respectively, for venting and draining the tank. In order to thoroughly accomplish their tasks these apertures are located as near the remote marginal edges of the respective faces as may be practicable in a manner affording communication with the ribs 22 so that a horizontal projection of the apertures would include the depths of the ribs 18 and 22 with the result that air and fuel collected in the ribs 18 may pass through ribs 22 and escape through the openings.

Figure 4:
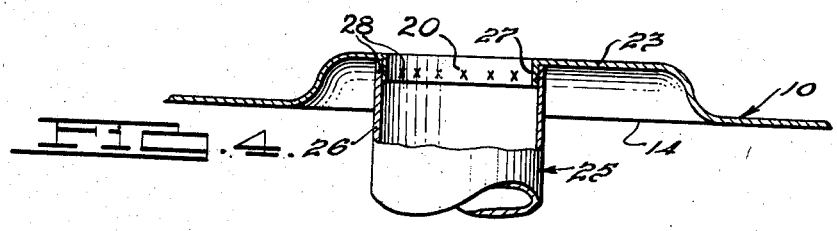
Fig. 4 is a cut-away view taken substantially on the line 4—4 of Fig. 2.

A conduit or spout 25 in open communication with the aperture 20, is provided to afford access to the tank from outside the automobile body. One end 26 of the spout is secured to the tank 12 in an air-tight relation as more particularly illustrated in Fig. 4 wherein the marginal edge of the aperture 20 is shaped to provide a horizontally extending cylindrical flange 27 around which the end 26 of the spout is fitted and secured as by welding indicated at 28. The other end of the spout 29 is suitably supported relative to the outside of the automobile body and the portion of the spout intermediate its ends is so inclined that air escaping from the tank through the aperture will be carried without hinderance to the end 29 of the spout from whence it is freed to the atmosphere. In this connection it is to be observed that the end 26 of the spout is preferably disposed outside the flange rather than in it so that the effective venting area of the aperture 20 will not be reduced by the thickness of the spout wall as would be the case if it was disposed inside the flange. Consequently it will be seen from the description thus far that air levitating in the tank follows the inclined reinforcing ribs to the rib 22 from where it is vented above the top wall 13 of the tank through the aperture 20 into the spout 25, and from there released to the atmosphere.

Figure 5:
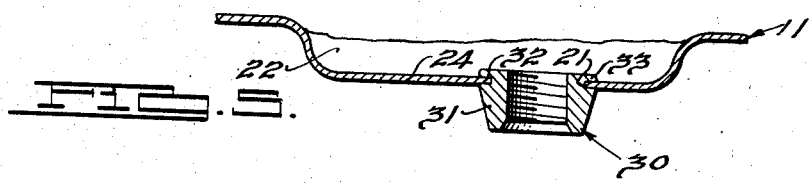
Fig. 5 is a sectional view taken on the line 5—5 of Fig. 2.

Fig. 5 shows the details by which the drain member 30 is supported on the face 24. The aperture 21, as already described, is positioned below the bottom of the tank and in communication with the rib 18 through the rib 22. An internally threaded, plug-receiving drain member 31 with a circumferential shoulder 32 is inserted in the aperture and sealed there by upsetting the body portion to form a radial flange 33 which clamps the marginal edges of the aperture 21 between it and the shoulder 32. By this means, liquid gravitating in the tank will collect in the ribs below the bottom of the tank and flow to the rib 22 from whence it can be discharged through the drain plug 30 without leaving any liquid above the level of the tank bottom.

From the description thus far it is seen that two similar shell members have been fabricated and related so as to provide an improved tank with similar conformations on each shell which perform different functions in the tank. Although the structural characteristics of each shell may be made similar to such an extent that they may be formed identically by the same mold or die (not shown) yet it is seen that these ribs not only perform a common function of reinforcing the tank but the ribs of the lower section, due to their downward inclination provide for an efficient draining of the tank through the drain plug, while the upper ribs, due to their extending at an upward angle, eliminate air lock by providing an air escape space in open communication with the filler spout above the normal top wall of the tank. Additionally it is to be noted that the outward disposition of the rib structure enables the tank to receive more fuel than is otherwise possible with conventional tanks having the same inside dimensions.

In the particular embodiment of the invention illustrated, the shells 10 and 11 of the tank comprise sheet metal stampings and the ribs 17 and 18 are provided with a substantial width to give the tank added control of the air and fluid and to increase the volume of the tank. The draw of the metal around the rib 18 is much greater than the draw around the rib 17 since the former is the deeper of the two ribs. However, a certain stress is established in the rib 17 by the deeper draw around the other rib and the bottom of the rib 17 has a fullness in the center of the metal causing a vibration or flutter like the bottom of an oil can. This fullness and vibration is eliminated and the tank further reinforced by secondary ribs 34 provided therein which run longitudinally with the ribs 17 and are pressed into the bottom portion of the latter to a depth absorbing the fullness mentioned so as to provide a tight draw reinforced against vibration and tank strains.

Figure 6:
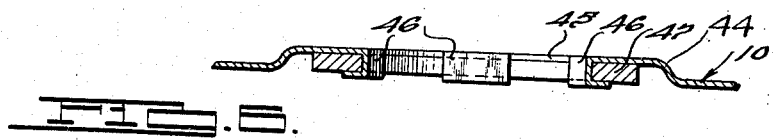
Fig. 6 is a sectional view taken on the line 6—6 of Fig. 1.

Referring again to Figs. 1 and 3, the improved tank is equipped with a fuel indicator of the float lever electric induction type comprising a fixed depending arm 40 and a mobile arm 41 pivoted thereto at one end as at 42 and carrying a float 43 at the other end. The attachment of the arm 40 to the tank is more particularly shown in Fig. 3 where it will be seen that the upper and lower shells 10 and 11 are similarly provided with outwardly disposed circular wells 44 and 48 in the bases 13 respectively. The well 44 is provided with an opening 45 therein, as more particularly shown in Fig. 6, with downwardly and inwardly bent flanges 46 retaining a reinforcing ring 47 against the inner face of the well.

The depending arm 40 is suitably supported within the tank through the opening 45 where an air-tight joint is appropriately established against leakage of fuel. The arms 40 and 41 are so constructed and arranged in length and pivotal relation as to direct the float to engage the base 13 exclusive of the ribs 19 when in a lowered position and to utilize the head space afforded by one of the ribs 19, as indicated in phantom at 49, when moved to its upper extremity. In this way a gauge is provided which registers empty as a warning when there is still a substantial reserve left in the bottom and in the ribs to take care of unforeseen contingencies. It will be appreciated, however, that with a slight adjustment of the length of the arms 40 and 41 the float could be directed to utilize ribs 19 at both extremities of movement if it should be desirable to reduce the reserve supply factor.

In filling the tank, the gauge has a full movement with the actual level of the liquid as it approaches the top of the tank. This accurately registers the amount of fuel so that one filling the tank and viewing the gauge will know exactly how much more fuel can be received by the tank. In this relation the rib structures afford a safe margin above the top of the tank in which the filling station pump may be brought to an even gallon without an overflow and waste of fuel.

In the particular embodiment of the invention illustrated, a fuel line 50 is associated with the arm 40 passing through the same opening therewith. This association may be desirable where the float gauge and fuel line are inserted into the tank together after the sections are welded together. However, whether the fuel line is supported by the same means as the gauge or enters the tank through another opening or has access to the interior in any one of the well known ways, it is preferable that the inlet end 51 of the line be located in the lowest portion of the rib structures, the particular embodiment utilizing one of the ribs 19. Consequently, the rib structures not only reinforce and increase the capacity of the tank but they also further enable a full use of the reserve fuel in the tank before the motor stops.

Accordingly, an improved tank is provided which is simple in its construction, efficient in its purpose and use, and inexpensive to manufacture, and which includes two similar sections reinforced and related to eliminate air lock and promote drainage. Additionally, the improved tank affords the fuel intake a greater accessibility to all the fuel in the tank and a greater accuracy and reserve for the level indicator in addition to a larger capacity than is possible with the conventional tank.

Although a preferred embodiment of the invention has been shown and described herein it will be apparent to those skilled in the art that various uses, modifications and changes may be made therein without departing from the spirit and substance of the invention, the scope of which is commensurate with the appended claims.

What is claimed is:

1. A fuel tank having an upwardly extending channel-like rib means running in one direction and another rib means intersecting said first means, said rib means both increasing in depth towards one end of said tank for collecting at said end air levitating to the top of said tank, and a filler tube fixed to the tank in direct communication with the space formed by the deepest portion of said rib means.

2. A fuel storage tank comprising a plurality of walls forming a chamber, the upper wall of said tank being formed with outwardly extending intersecting rib means providing an air space above the entire full fluid level in the chamber, said rib means being formed to increase the depth of the air space in the tank from one end toward the other end, and a filled tube fixed at one end to the tank, the fixed end of the tube having a portion opening directly to the deepest portion of the air space and another portion opening directly to the chamber below the full fluid level.

3. A fuel storage tank comprising a pair of similar sheet metal members secured together in superposed relation to form a chamber, the upper and lower walls of the tank being formed with outwardly extending rib means forming an air relief manifold above the high liquid level in the tank chamber and of increasing depth from one end to the other end and the members being arranged so that the deepest portion of the spaces are at the same end of the tank, a filler pipe fixed to the tank with at least a portion thereof in direct communication with the spaced formed by the deepest portion of the upper rib means, and drain means associated with the lower member at the deepest portion of the space formed by the rib means.

4. A fuel tank comprising two similar shells having a substantially horizontal base wall bounded by sides terminating in outwardly extending flanges secured together, transversely extending outwardly disposed channels formed in the base of said sections of unequal depth, longitudinally extending outwardly disposed channels formed in the base of said sections in communication with the transverse channels, said longitudinally extending channels having their depth increasing from one to the other end of said tank, and vent means for each section disposed to open into the deepest portion of the channels in said sections, the channels in the upper section forming an air relief manifold over substantially the entire upper full level of liquid in the tank and the channels in the lower section forming a downwardly extending drain manifold for the fluid in the tank.

5. A fuel tank for motor vehicles comprising a wall means forming a fluid member, the top of said wall means having upstanding intersecting ribs forming a manifold above substantially the entire uppermost fluid level in the chamber, said manifold forming a relief for air in any operative angular position of the tank, and a filler neck fixed to said wall means with a portion of the interior thereof communicating directly with the manifold above the uppermost fluid level in the chamber.

6. A fuel tank for motor vehicles comprising wall means forming a fluid chamber, the top of said wall means having upstanding ribs extending longitudinally and transversely thereof and forming an air relief manifold above the full fluid capacity level of the chamber, and a filler neck fixed to said wall means with a portion of its entire length in open communication with the manifold above the level of the fluid when the chamber is full.

ERWIN A. WEISS.

CERTIFICATE OF CORRECTION.

Patent No. 2,180,185. November 14, 1939.

ERWIN A. WEISS.

It is hereby certified that error appears in the printed specification of the above numbered patent requiring correction as follows: Page 3, second column, line 1, claim 2, for the word "filled" read filler; and that the said Letters Patent should be read with this correction therein that the same may conform to the record of the case in the Patent Office.

Signed and sealed this 13th day of February, A. D. 1940.

(Seal)

Henry Van Arsdale,
Acting Commissioner of Patents.